(12) United States Patent
Kim et al.

(10) Patent No.: US 12,271,295 B2
(45) Date of Patent: Apr. 8, 2025

(54) ELECTRONIC DEVICE PERFORMING METHOD OF CONTROLLING MEMORY BASED ON TEMPERATURE AND AVAILABLE AREA OF THE MEMORY

(71) Applicant: SAMSUNG ELECTRONICS CO., LTD., Suwon-si (KR)

(72) Inventors: Dongho Kim, Suwon-si (KR); Jiman Kwon, Suwon-si (KR); Jaehyeon Park, Suwon-si (KR); Geonhee Back, Suwon-si (KR); Dongwook Lee, Suwon-si (KR); Daehyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/119,134

(22) Filed: Mar. 8, 2023

(65) Prior Publication Data
US 2023/0266905 A1    Aug. 24, 2023

Related U.S. Application Data

(63) Continuation of application No. PCT/KR2023/001484, filed on Feb. 2, 2023.

(51) Int. Cl.
*G06F 12/02* (2006.01)
(52) U.S. Cl.
CPC .................. *G06F 12/023* (2013.01)
(58) Field of Classification Search
CPC .................................................. G06F 12/023
See application file for complete search history.

(56) References Cited

U.S. PATENT DOCUMENTS

| 6,038,571 A * | 3/2000 | Numajiri ............... G06F 12/127 |
| 10,672,452 B2 | 6/2020 | Alsasua et al. |
| 2006/0112250 A1 | 5/2006 | Walker |

(Continued)

FOREIGN PATENT DOCUMENTS

| KR | 10-0953257 B1 | 4/2010 |
| KR | 10-2020-0069905 A | 6/2020 |

(Continued)

OTHER PUBLICATIONS

Li et al., "System-level, Thermal-aware, Fully-loaded Process Scheduling", 2008 IEEE International Symposium on Parallel & Distributed Processing, Apr. 14, 2008, XP031268197, total 7 pages.

(Continued)

*Primary Examiner* — Chie Yew
(74) *Attorney, Agent, or Firm* — Sughrue Mion, PLLC

(57) ABSTRACT

A method of controlling a memory and an electronic device performing the method are provided. The electronic device includes a memory configured to store instructions executable by the processor; and at least one processor configured to execute the instructions to: determine a use state of the electronic device corresponding to an available area of the memory, determine a temperature of the electronic device, determine a memory parameter based on the use state and the temperature, and convert a used area of the memory into the available area based on the memory parameter.

20 Claims, 7 Drawing Sheets

(56) References Cited

U.S. PATENT DOCUMENTS

| | | | |
|---|---|---|---|
| 2011/0225346 A1* | 9/2011 | Goss | G06F 12/0246 |
| | | | 711/170 |
| 2013/0103885 A1 | 4/2013 | Bates et al. | |
| 2019/0220318 A1* | 7/2019 | Yang | G06F 9/5022 |
| 2020/0159441 A1 | 5/2020 | Mayer et al. | |
| 2020/0183598 A1 | 6/2020 | Hong et al. | |
| 2020/0258565 A1 | 8/2020 | Schaefer et al. | |
| 2021/0149689 A1 | 5/2021 | Jung et al. | |
| 2021/0287737 A1 | 9/2021 | Belcourt et al. | |
| 2023/0185458 A1 | 6/2023 | Song et al. | |

FOREIGN PATENT DOCUMENTS

| | | |
|---|---|---|
| KR | 10-2021-0049602 A | 5/2021 |
| KR | 10-2021-0086150 A | 7/2021 |
| KR | 10-2021-0101081 A | 8/2021 |
| KR | 10-2021-0113427 A | 9/2021 |
| KR | 10-2022-0017085 A | 2/2022 |

OTHER PUBLICATIONS

Communication dated Feb. 3, 2025, issued by the European Patent Office in European Application No. 23756549.4.

* cited by examiner

| Use state | Heat generation state | Memory parameter variation |
|---|---|---|
| Critical | - | No change |
| Heavy | Severe | No change |
| | Critical | -15 |
| | Emergency, Shutdown | -30 |
| Normal | Severe | -15 |
| | Critical | -30 |
| | Emergency, Shutdown | -60 |
| Light | Severe | -30 |
| | Critical | -60 |
| | Emergency, Shutdown | Set minimum value |

FIG. 7

ELECTRONIC DEVICE PERFORMING METHOD OF CONTROLLING MEMORY BASED ON TEMPERATURE AND AVAILABLE AREA OF THE MEMORY

CROSS-REFERENCE TO RELATED APPLICATIONS

This application is a continuation application of International Application No. PCT/KR2023/001484 designating the United States, filed on Feb. 2, 2023, in the Korean Intellectual Property Receiving Office and claiming priority to Korean Patent Application No. 10-2022-0021418, filed on Feb. 18, 2022, and Korean Patent Application No. 10-2022-0028906, filed on Mar. 7, 2022, in the Korean Intellectual Property Office, the disclosures of which are incorporated by reference herein in their entireties.

BACKGROUND

1. Field

The disclosure relates to a method of controlling a memory and an electronic device performing the method.

2. Description of Related Art

Memory management for electronic devices, for example management of random access memory (RAM), may be used to assist in smooth operation of an operating systems, services, and applications, and allow management of memory allocation or reclamation, or process termination when necessary. Modules used for memory management may include a kernel swap daemon (Kswapd), a low memory killer (LMK), and a low memory killer daemon (LMKD) in a kernel space.

Heat control techniques for electronic devices may adjust the temperature of the terminals through hardware or software control to prevent increases in the temperature of the terminals. The memory management performance and heat control performance may affect the terminal performance.

SUMMARY

Provided are a memory control method and an electronic device performing the method that may control an operation of a Kswapd, which is associated with CPU occupation and memory management, in view of heat generation information and state information of a memory, thereby improving terminal performance and heat generation control.

In accordance with an aspect of the disclosure, an electronic device includes a memory electrically configured to store instructions; and at least one processor configured to execute the instructions to: determine a use state of the electronic device corresponding to an available area of the memory, determine a temperature of the electronic device, determine a memory parameter based on the use state and the temperature, and convert a used area of the memory into the available area based on the memory parameter.

The at least one processor may be further configured to execute the instructions to: terminate a process using an area of the memory according to a priority of the process based on the available area of the memory and a predetermined threshold, and determine the use state based on the priority of the terminated process.

The at least one processor may be further configured to execute the instructions to: compress data stored in the used area of the memory and store the compressed data in a predetermined area of the memory, based on the memory parameter, and convert the used area of the memory into the available area by deleting the data stored in the used area of the memory.

A size of the memory parameter may be positively correlated with a size of the converted available area.

A size of the memory parameter may be negatively correlated with a size of the available area of the memory according to the use state, and the size of the memory parameter may be negatively correlated with the temperature.

The at least one processor may be further configured to execute the instructions to determine the memory parameter based on a table indicating a variation to be applied to the memory parameter according to the use state and the temperature.

The at least one processor may be further configured to execute the instructions to maintain a predetermined memory parameter as the memory parameter based on the use state being a predetermined use state.

The at least one processor may be further configured to execute the instructions to determine a threshold for converting the used area of the memory into the available area based on the temperature, and convert the used area of the memory into the available area based on an amount of the available area of the memory and the threshold.

In accordance with an aspect of the disclosure, an electronic device includes a memory electrically configured to store instructions; and at least one processor is configured to execute the instructions to: determine a use state of the electronic device corresponding to an available area of the memory, determine a temperature of the electronic device, determine a threshold for converting a used area of the memory into the available area based on the temperature, determine a memory parameter based on the use state and the temperature, and based on a size of the available area of the memory being less than the threshold, convert the used area of the memory into the available area according to the memory parameter.

The at least one processor may be further configured to execute the instructions to determine the threshold to be positively correlated with the temperature.

The at least one processor may be further configured to execute the instructions to: compress data stored in the used area of the memory and store the compressed data in a predetermined area of the memory, based on the memory parameter, and convert the used area of the memory into the available area by deleting the data stored in the used area of the memory.

A size of the memory parameter may be negatively correlated with the available area of the memory according to the use state, and the size of the memory parameter may be negatively correlated with the temperature.

In accordance with an aspect of the disclosure, a method of controlling a memory includes determining a use state corresponding to an available area of the memory; identifying a temperature of an electronic device comprising the memory; determining a memory parameter based on the use state and the temperature; and converting a used area of the memory into the available area based on the memory parameter.

The determining of the use state may include terminating a process using an area of the memory according to a priority of the process based on the available area of the memory and a predetermined threshold; and determining the use state based on the priority of the terminated process.

The converting into the available area of the memory may include compressing data stored in the used area of the memory and storing the compressed data in a predetermined area of the memory, based on the memory parameter; and converting the used area of the memory into the available area by deleting the data stored in the used area of the memory.

A size of the memory parameter may be positively correlated with a size of the converted available area of the memory.

A size of the memory parameter may be negatively correlated with the available area of the memory according to the use state, and the size of the memory parameter may be negatively correlated with the temperature.

The determining of the memory parameter may include determining the memory parameter based on a table indicating a variation to be applied to the memory parameter according to the use state and the temperature.

The determining of the memory parameter may include maintaining a predetermined memory parameter as the memory parameter based on the use state being a set use state.

The method may further include determining a threshold based on the temperature, and the converting of the used area of the memory into the available area of the memory may be performed based on an amount of the available area of the memory and the threshold.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 7 is a diagram illustrating a variation in a memory parameter according to a use state of a memory and a temperature according to an embodiment.

DETAILED DESCRIPTION

Figure 1:
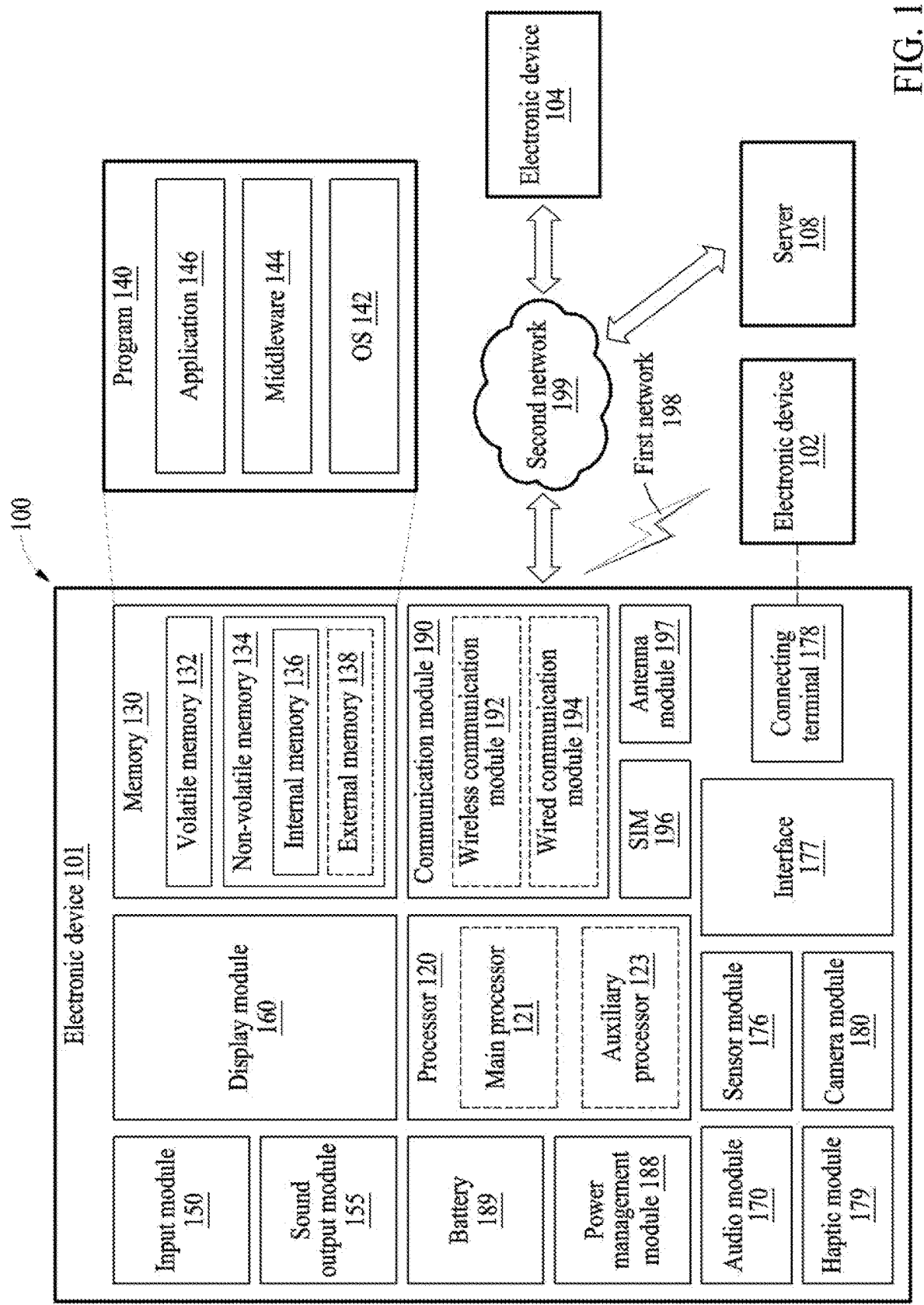
FIG. 1 is a block diagram illustrating an electronic device in a network environment according to an embodiment.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
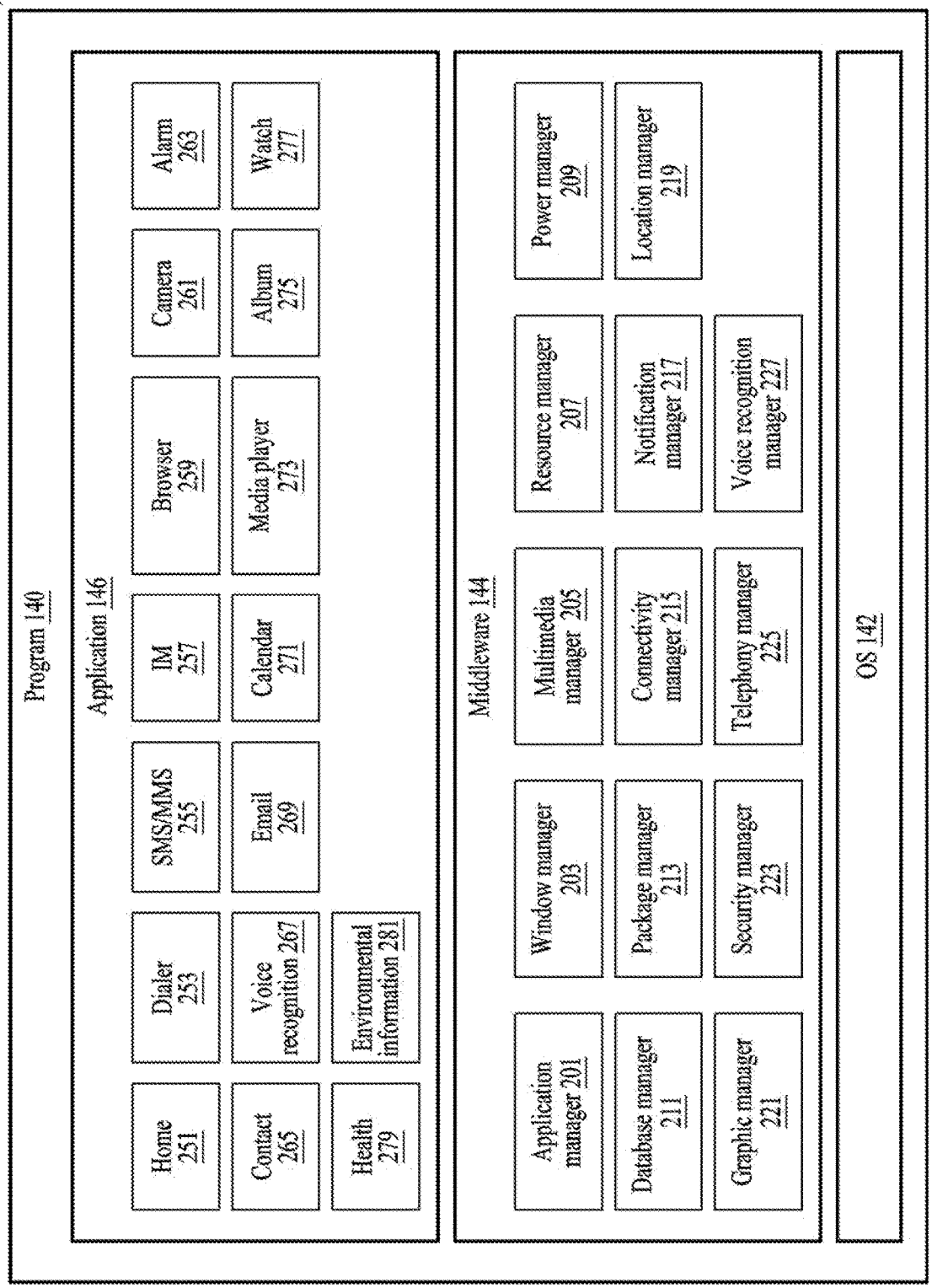
FIG. 2 is a block diagram illustrating a program according to an embodiment.

FIG. 2 is a block diagram 200 illustrating a program 140 according to an embodiment. According to an embodiment, the program 140 may include an OS 142 to control one or more resources of the electronic device 101, middleware 144, or an application 146 executable in the OS 142. The OS 142 may include, for example, Android™, iOS™ Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an embodiment, the power manager 209 may interwork with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home application 251, dialer application 253, short message service (SMS)/multimedia messaging service (MMS) application 255, instant message (IM) application 257, browser application 259, camera application 261, alarm application 263, contact application 265, voice recognition application 267, email application 269, calendar application 271, media player application 273, album application 275, watch application 277, health application 279 (e.g., for measuring the degree of workout or biometric information, such as blood sugar), or environmental information application 281 (e.g., for measuring air pressure, humidity, or temperature information) application. According to an embodiment, the application 146 may further include an information exchanging application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, deletion, or update of an application that operates in an external electronic device.

Figure 3:
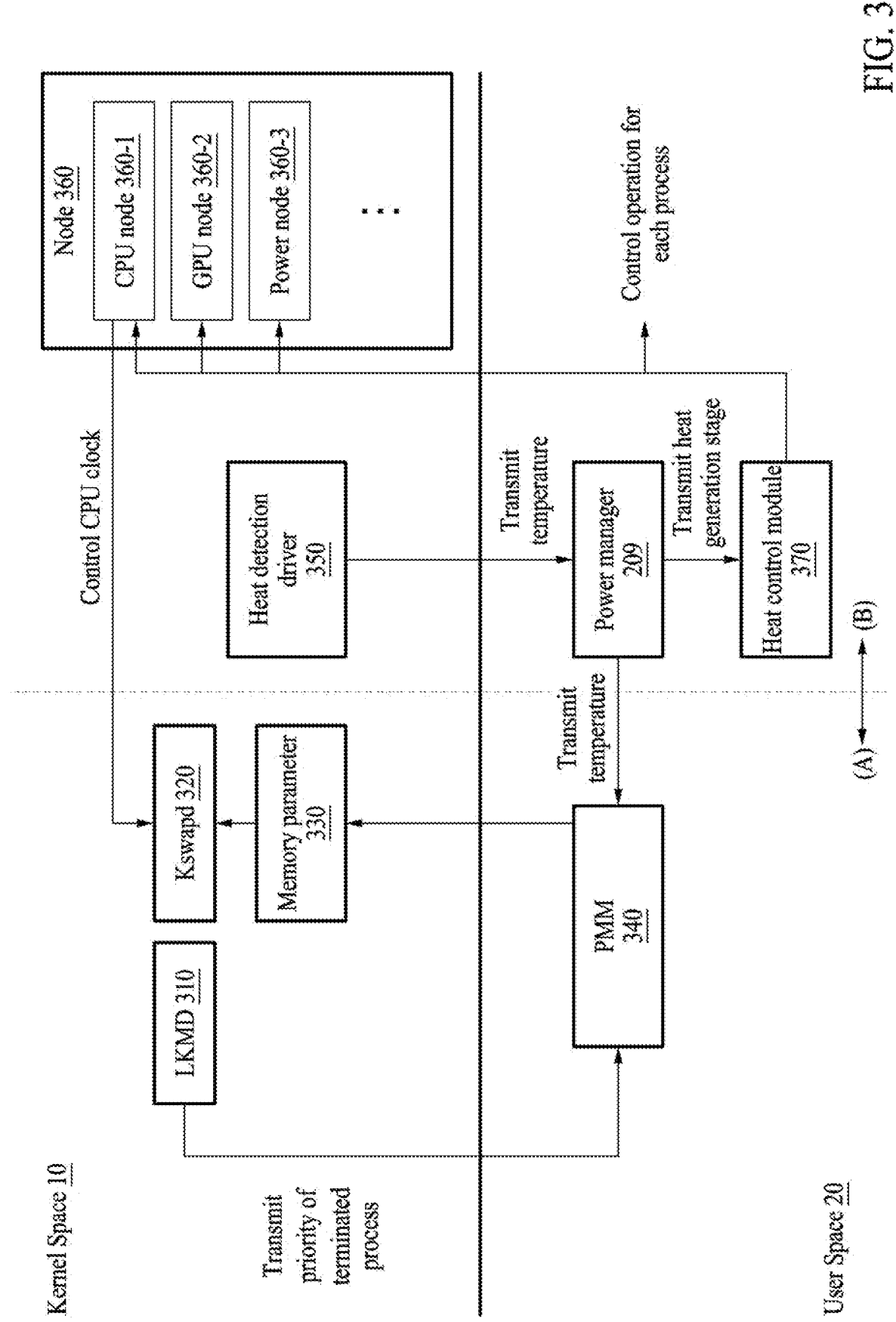
FIG. 3 is a diagram illustrating a memory control operation of an electronic device according to an embodiment.

FIG. 3 is a diagram illustrating an operation of controlling a memory (e.g., the memory 130 of FIG. 1) by an electronic device (e.g., the electronic device 101 of FIG. 1) according to an embodiment. The memory 130 described below with reference to FIGS. 3 to 7 may be a volatile memory (e.g., the volatile memory 132 of FIG. 1).

Referring to FIG. 3, the electronic device 101 may include a low memory killer daemon (LMKD) 310, a kernel swap daemon (Kswapd) 320, a personalized memory manager (PMM) 340 (e.g., the resource manager 207 of FIG. 2), a heat detection driver 350, a power manager (e.g., the power manager 209 of FIG. 2), a node 360, or a heat control module 370.

As an example, one or more of the LMKD 310, the Kswapd 320, the node 360, or the heat detection driver 350 may be a module operating in a kernel space 10. As an example, one or more of the PMM 340, the power manager 209, or the heat control module 370 may be a module operating in a user space 20.

In FIG. 3, Region (A) may be understood as a region illustrating components that perform operations in relation to a memory, and Region (B) may be understood as a region illustrating components for controlling the heat generation or temperature of the electronic device.

As an example, the electronic device 101 may determine a use state of the memory 130. For example, the electronic device 101 may determine the use state of the memory 130 using the PMM 340. For example, the PMM 340 may receive a priority of a terminated process from the LMKD 310. The electronic device 101 may determine the use state of the memory 130 based on the priority of the terminated process that is received by the PMM 340.

For example, the use state of the memory 130 may be classified as Light, Normal, Heavy, or Critical. The use state of the memory 130 may indicate that a size of an available area of the memory 130 in a decreasing order of Light, Normal, Heavy, and Critical. For example, the size of the available area of the memory 130 may be (Light>Normal>Heavy>Critical).

As an example, the electronic device 101 may detect a lack of the memory 130 and terminate a process to reclaim the memory 130. For example, when the available area of the memory 130 is less than or equal to a set threshold, the electronic device 101 may terminate a process that uses an area of the memory 130, for example, a process being executed. For example, the LMKD 310 in the kernel space 10 may terminate the process being executed, thereby securing an available area of the memory 130.

As an example, the LMKD 310 may terminate processes according to priorities set for the processes. For example, priority parameters (e.g., ood_adj) from "0" to "999" may be set for the processes. The LMKD 310 may sequentially terminate the processes based on the priority parameters. For example, the LMKD 310 may sequentially terminate the processes, starting from a process having a high priority parameter. However, embodiments are not limited thereto, and in embodiments the LMKD 310 may sequentially terminate the processes, starting from a process having a low priority parameter. The LMKD 310 may suspend the operation of terminating a process when the available area of the memory 130 is greater than or equal to the set threshold.

As an example, the LMKD 310 may terminate a process and transmit a priority parameter set for the process to the PMM 340. The electronic device 101 may determine the use state of the memory 130 based on the priority of the terminated process. For example, when the LMKD 310 terminates a process having a priority parameter of less than or equal to "800", the electronic device 101 may determine the use state of the memory 130 to be Critical.

As another example, when the LMKD 310 terminates a process having a priority parameter of greater than "800" and less than or equal to "850" the electronic device 101 may determine the use state of the memory 130 to be Heavy, when the LMKD 310 terminates a process having a priority parameter of greater than "850" and less than or equal to "900" the electronic device 101 may determine the use state of the memory 130 to be Normal, or when the LMKD 310 terminates a process having a priority parameter of greater than "900" the electronic device 101 may determine the use state of the memory 130 to be Light.

The threshold for the priority parameter is merely provided as an example, and the electronic device 101 may determine the use state of the memory 130 based on a priority parameter or threshold that is different from the above example.

As an example, the electronic device 101 may identify the temperature. For example, the electronic device 101 may include a heat detection sensor (e.g., a thermal sensor). The heat detection driver 350 may transmit the temperature measured by the heat detection sensor to the power manager 209. According to the position of the heat detection sensor, the heat detection driver 350 may transmit the temperature of a component of the electronic device 101, such as the processor 120, the memory 130, the battery, or the surface of the electronic device 101, to the power manager 209.

As an example, the electronic device 101 may classify a heat generation state as None, Light, Moderate, Severe, Critical, Emergency, or Shutdown according to the temperature. For example, the heat generation state may indicate the temperature in an increasing order of None, Light, Moderate, Severe, Critical, Emergency, and Shutdown. For example, the temperature for each state may be (None<Light<Moderate<Severe<Critical<Emergency<Shutdown). Each heat generation state may be classified by a set threshold. For example, the heat generation state may be classified as Shutdown by a set threshold of greater than or equal to 80° C., or as Emergency by a set threshold of greater than or equal to 65° C. or less than 80° C.

As an example, the power manager 209 may transmit the identified temperature information to the PMM 340. The PMM 340 may determine a memory parameter 330 based on the use state of the memory 130 and the temperature. The memory parameter 330 may be a parameter related to a size for converting a used area of the memory 130 into an available area. For example, the electronic device 101 may convert or return a used area of the memory 130 into an available area. The size of the converted available area of the memory 130 may be determined according to the memory parameter 330.

As an example, the electronic device 101 may convert a used area of the memory 130 into an available area of the memory 130 using the Kswapd 320. For example, the Kswapd 320 may delete data stored in a clean page of the used area of the memory 130. As another example, the Kswapd 320 may compress data stored in a dirty page of the used area of the memory 130, store the compressed data in a set area of the memory 130, and delete the data stored in the dirty page.

For example, an area of the memory 130 may be divided into pages each having a predetermined size (e.g., 4 KB). Pages may be grouped as a shared category used for multiple processes. Among the pages grouped as a shared category, a page that stores an unmodified copy of a file stored in a storage (e.g., the non-volatile memory 134 of FIG. 1) may be classified as a clean page, and a page that stores a modified copy of a file stored in the storage may be classified as a dirty page.

For example, the Kswapd 320 may convert a used area of the memory 130 into an available area by deleting data stored in a clean page of the used area of the memory 130.

For example, the Kswapd 320 may compress data stored in a dirty page of the used area of the memory 130 and store the compressed data in a set area of the memory 130. For example, the electronic device 101 may designate the set area (e.g., zRAM) in the memory 130 (e.g., RAM). In arranging data in the set area of the memory 130, the data may be compressed and stored. In outputting the compressed data from the set area of the memory 130, the compressed data may be decompressed and output. The electronic device 101 may change the size of the set area.

For example, the Kswapd 320 may convert a used area of the memory 130 into an available area by deleting data stored in a dirty page of the used area of the memory 130. The Kswapd 320 may compress the data stored in the dirty page, store the compressed data in the set area, and then delete the data stored in the dirty page.

As an example, the electronic device 101 may convert a used area of the memory 130 into an available area based on the memory parameter 330. For example, the Kswapd 320 may convert a used area of the memory 130 into an available area based on the memory parameter 330.

As an example, the memory parameter 330 may have a positive correlation with the size of the converted available area. For example, as the memory parameter 330 is greater, the Kswapd 320 may convert a larger used area of the memory 130 into an available area. For example, as the memory parameter 330 is greater, the Kswapd 320 may compress data stored in more dirty pages, store the compressed data in a set area of the memory 130, and delete the data stored in the dirty pages. As another example, as the memory parameter 330 is greater, the Kswapd 320 may perform the operation of compressing data stored in dirty pages a greater number of times and perform the operation of deleting the data stored in the dirty pages a greater number of times.

In the operation of the Kswapd 320 compressing data stored in a dirty page of the used area of the memory 130, storing the compressed data in a set area, and deleting the data stored in the dirty page, the data stored in the dirty page may be compressed using the processor 120 (e.g., a CPU or an AP). The operation of the Kswapd 320, for example, the operation of compressing data stored in a dirty page, may be related to the operation of the processor 120, and the operation of the processor 120 may affect the temperature or heat generation of the electronic device 101.

For example, as the Kswapd 320 performs the operation of compressing data stored in a dirty page, storing the compressed data in a set area of the memory 130, and deleting the dirty page a greater number of times, the processor 120 may perform more operations (e.g., compressing the data stored in the dirty page), which may increase the temperature of the electronic device 101.

As an example, the electronic device 101 may determine the memory parameter 330 based on the use state of the memory 130 and the temperature. The Kswapd 320 may convert a used area of the memory 130 into an available area according to the memory parameter 330. The electronic device 101 may determine the memory parameter 330 based on the use state of the memory 130 and the temperature, thereby appropriately securing an available area of the memory 130 to maintain the performance of the electronic device 101 and control the heat generation of the electronic device 101 at the same time.

As an example, the electronic device 101 may determine the memory parameter 330 to have a negative correlation with the size of an available area of the memory 130. When the size of the available area of the memory 130 is large, the electronic device 101 may control the heat generation of the electronic device 101 by determining a small memory parameter 330. When the size of the available area of the memory 130 is large, the performance of the electronic device 101 may be maintained even if the electronic device 101 secures a smaller available area of the memory 130.

As an example, the electronic device 101 may determine the size of the memory parameter 330 to have a negative correlation with the temperature. When the temperature is high, the electronic device 101 may control the heat generation of the electronic device 101 by determining a small memory parameter 330.

For example, the memory parameter 330 determined by the electronic device 101 may be a swappiness. For example, the Kswapd 320 may compress data stored in more dirty pages as the value of the swappiness is greater. The Kswapd 320 may convert a larger used area of the memory 130 into an available area as the value of the swappiness is greater.

For example, the electronic device 101 may determine the memory parameter 330 based on the use state of the memory 130 and the temperature. When the memory parameter 330 is initially set to "160", the use state of the memory 130 is Normal, and the heat generation state according to the temperature is Severe, the electronic device 101 may determine the memory parameter 330 to be "145". In the same example, when the heat generation state according to the temperature changes to Critical, the electronic device 101 may determine the memory parameter 330 to be "130", when the heat generation state according to the temperature changes to Emergency, the electronic device 101 may determine the memory parameter 330 to be "100", and when the heat generation state according to the temperature changes to Shutdown, the electronic device 101 may determine the memory parameter 330 to be "100".

When the temperature rises in the same use state of the memory 130, the electronic device 101 may determine the memory parameter 330 to have a negative correlation with the temperature, thereby suppressing the rise in the temperature of the electronic device 101.

As another example, when the memory parameter 330 is initially set to "160", the heat generation state of the electronic device 101 according to the temperature is Severe, and the use state of the memory 130 is Light, the electronic device 101 may determine the memory parameter 330 to be "130". In the same example, when the use state of the memory 130 changes to Normal, the electronic device 101 may determine the memory parameter 330 to be "145", when the use state of the memory 130 changes to Heavy, the electronic device 101 may determine the memory parameter 330 to be "160", and when the use state of the memory 130 changes to Critical, the electronic device 101 may determine the memory parameter 330 to be "160".

When the size of the available area of the memory 130 decreases according to the use state in the same heat generation state according to the temperature, the electronic device 101 may determine the memory parameter 330 to have a negative correlation with the size of the available area of the memory 130, thereby securing an available area of the memory 130 and maintaining the performance of the electronic device 101.

As an example, the electronic device 101 may determine a threshold for the operation of the Kswapd 320 according to the temperature. The threshold for the operation of the Kswapd 320 may be a threshold for the initiation or termination of the operation of the Kswapd 320 converting a used area of the memory 130 into an available area.

The electronic device 101 may convert a used area of the memory 130 into an available area based on the available area of the memory 130 and the threshold. For example, when the size of the available area of the memory 130 is less than the threshold, the Kswapd 320 may convert the used area of the memory 130 into an available area. For example, when the size of the available area of the memory 130 is greater than the threshold, the Kswapd 320 may suspend the operation of converting the used area of the memory 130 into an available area.

For example, the electronic device 101 may determine the threshold for the operation of the Kswapd 320 according to the temperature. The operation of the Kswapd 320 may be related to the operation of the processor 120, and the temperature of the electronic device 101 may increase according to the operation of the Kswapd 320. As a result, electronic device 101 may control the heat generation of the electronic device 101 by determining the threshold for the operation of the Kswapd 320 according to the temperature.

For example, the electronic device 101 may determine the threshold for the operation of the Kswapd 320 to have a positive correlation with the temperature. For example, when the temperature is high, the temperature or heat generation of the electronic device 101 according to the operation of the Kswapd 320 may be controlled by determining a high threshold for the operation of the Kswapd 320.

As an example, the heat control module 370 may receive a heat generation stage or a temperature from the power manager 209. The heat control module 370 may control the operation of the electronic device 101 or the operation of the node 360 for each process according to the received temperature or heat generation stage. For example, when the heat generation stage is Severe, Critical, Emergency, or Shutdown, the heat control module 370 may restrict the operation of the processor 120 through a CPU node 360-1. For example, when the operation of the processor 120 is restricted through the CPU node 360-1, the operation of the Kswapd 320 may be restricted by controlling a CPU clock. The heat control module 370 may restrict the heat generation by controlling the operation of the electronic device 101 through the CPU node 360-1, a GPU node 360-2, a power node 360-3, and the like.

As described above with reference to FIG. 3, the electronic device 101 may determine the memory parameter 330 related to the use state of the memory 130 and the temperature. The electronic device 101 may determine the memory parameter 330 in view of both the use state of the memory 130 and the temperature, thereby controlling the heat generation of the electronic device 101 and maintaining the performance of the electronic device 101 at the same time.

The electronic device 101 may control the heat generation of the electronic device 101. For example, in FIG. 3, the electronic device 101 may control the heat generation of the electronic device 101 by controlling the clock of the CPU node 360-1 through the heat control module 370 or changing the luminance or scanning rate of a display module (e.g., the display module 160 of FIG. 1).

Unlike the case of controlling the heat generation of the electronic device 101 by changing the CPU (e.g., the processor 120 of FIG. 1) clock or the luminance or scanning rate of the display module 160, the electronic device 101 may control the operation of the Kswapd 320 by determining the memory parameter 330, thereby controlling the heat generation of the electronic device 101, as shown in FIG. 3. By controlling the operation of the Kswapd 320 based on the use state of the memory 130 received from the LMKD 310 and the temperature received from the power manager 209, the electronic device 101 may control the heat generation while maintaining the performance of the electronic device 101.

For example, in FIG. 3, controlling the operation of the Kswapd 320 by determining the memory parameter 330 by the electronic device 101 may be understood as being intended to control the heat generation of the electronic device 101.

Figure 4:
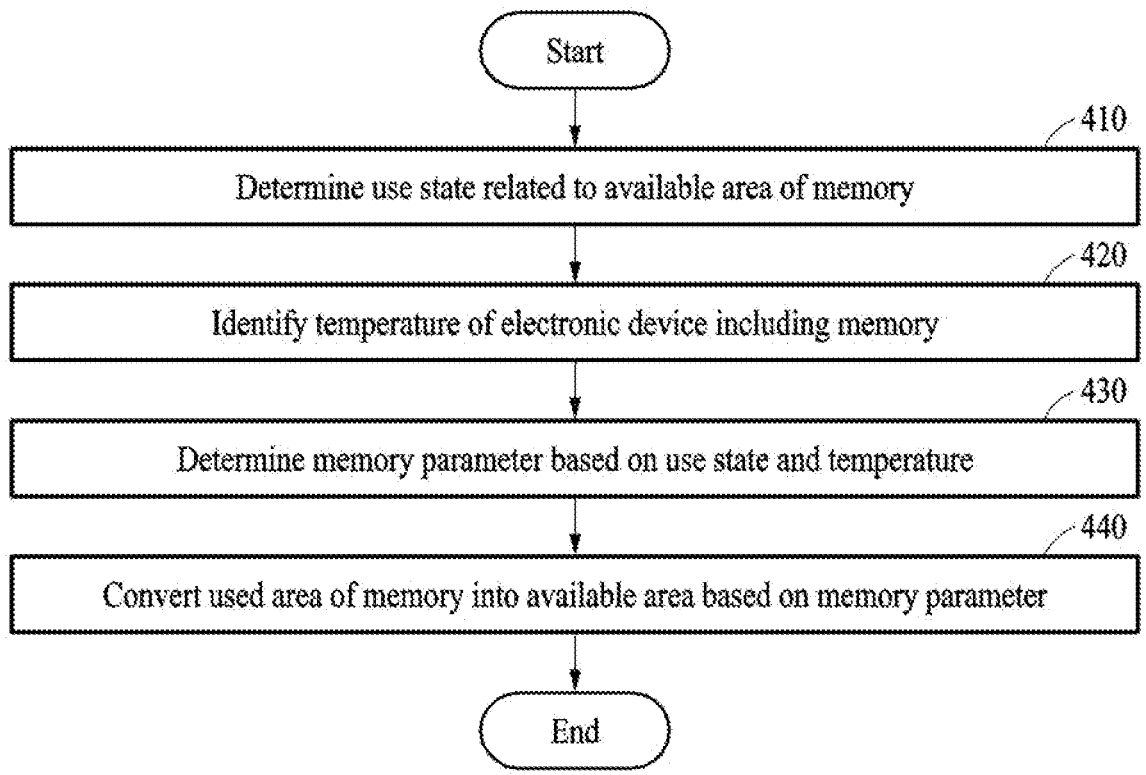
FIG. 4 is a flowchart illustrating a memory control method according to an embodiment.

FIG. 4 is a flowchart illustrating a memory (e.g., the memory 130 of FIG. 1) control method according to an embodiment.

Referring to FIG. 4, an electronic device (e.g., the electronic device 101 of FIG. 1) may determine a use state related to an available area of the memory 130, in operation 410. For example, when the size of the available area of the memory 130 is less than a set size, the use state of the memory 130 may be determined based on a priority of a terminated process received from an LMKD (e.g., the LMKD 310 of FIG. 3) that terminates a process being executed.

As an example, the electronic device 101 may identify the temperature of the electronic device 101 including the memory 130, in operation 420. For example, the electronic device 101 may include a temperature sensor, and a heat detection driver (e.g., the heat detection driver 350 of FIG. 3) may transmit the temperature sensed by the temperature sensor to a power manager (e.g., the power manager 209 of FIG. 2). The electronic device 101 may classify the temperature into a plurality of ranges and set a heat generation state according to the temperature. For example, the heat generation state may be classified as None, Light, Moderate, Severe, Critical, Emergency, or Shutdown according to the temperature range.

As an example, the electronic device 101 may determine a memory parameter (e.g., the memory parameter 330 of FIG. 3) based on the use state and the temperature, in operation 430. The memory parameter 330 may be a parameter related to the size of the converted available area of the memory 130 or a number of times of the operation of converting a used area of the memory 130 into an available area. For example, the memory parameter 330 may have a positive correlation with the size of the converted available area of the memory 130. For example, as the memory parameter 330 increases, the electronic device 101 may convert a larger used area of the memory 130 into an available area.

As an example, the electronic device 101 may convert a used area of the memory 130 into an available area based on the memory parameter 330, in operation 440. As an example, a Kswapd (e.g., the Kswapd 320 of FIG. 3) of the electronic device 101 may compress data stored in a used area of the memory 130, store the compressed data in a set area of the memory 130, and delete the data stored in the used area of the memory 130, based on the memory parameter 330. For example, as the memory parameter 330 is greater, the Kswapd 320 may compress data stored in a larger used area of the memory 130, store the compressed data in a set area of the memory 130, and delete the data stored in the used area of the memory 130.

For example, the electronic device 101 may determine the memory parameter 330 to have a negative correlation with the size of the available area of the memory 130 and a negative correlation with the temperature of the electronic device 101. As the memory parameter 330 increases, the size of the converted available area of the memory 130 may be larger. When the size of the available area of the memory 130 is large or the temperature is high, the electronic device 101 may set the memory parameter 330 to be small, for example, change the initially set memory parameter 330 to a small size.

Operation 440 in which the electronic device 101 converts a used area of the memory 130 into an available area may include an operation of compressing data stored in the used area of the memory 130. Since the operation of compressing data increases the usage occupancy of the processor 120 or causes a processor (e.g., the processor 120 of FIG. 1) to perform more operations, the temperature of the electronic device 101 may increase or the heat generation state may be degraded according to the operation of the processor 120. According to embodiments, the electronic device 101 may secure an available area of the memory 130 in view of the temperature or the heat generation state of the electronic device 101, thereby maintaining the performance of the electronic device 101 and controlling the heat generation at the same time through securing the memory 130.

Figure 5:
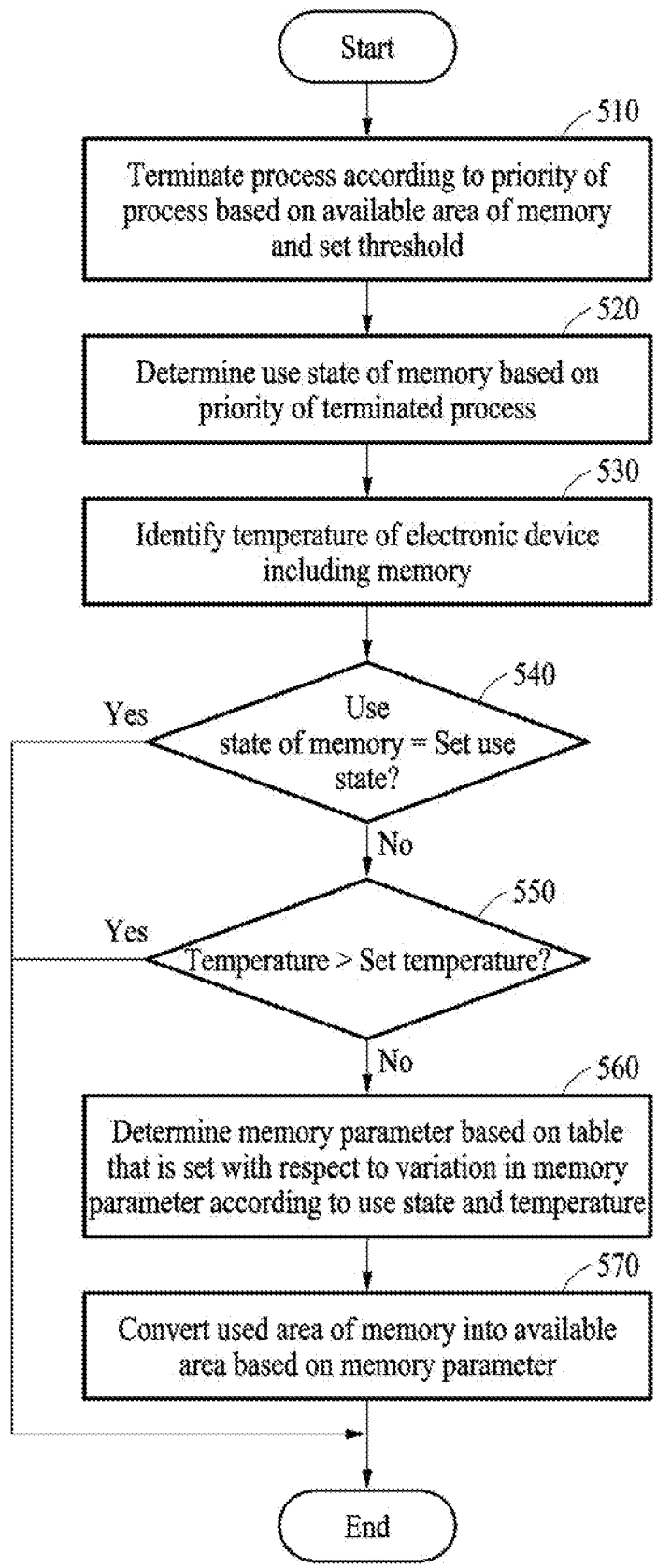
FIG. 5 is a flowchart illustrating a memory control method considering a use state of a memory and a temperature according to an embodiment.

FIG. 5 is a flowchart illustrating a memory (e.g., the memory 130 of FIG. 1) control method considering a use state of the memory 130 and a temperature according to an embodiment.

Referring to FIG. 5, an electronic device (e.g., the electronic device 101 of FIG. 1) may terminate a process according to a priority of the process based on an available area of the memory 130 and a set threshold, in operation 510. For example, the electronic device 101 may terminate a process being executed using an LMKD (e.g., the LMKD 310 of FIG. 3) when there is a lack of memory 130, for example, when there is a lack of an available area of the memory 130. When the size of the available area of the memory 130 is less than or equal to a set threshold, the LMKD 310 may terminate the process being executed.

For example, the LMKD 310 may sequentially terminate processes according to priorities set for the processes. For example, a priority parameter such as oom_adj may be set for each process. The priority parameter may be set to a value of greater than or equal to "0" and less than or equal to "999". The LMKD 310 may sequentially terminate the processes, starting from a process having a high priority parameter.

As an example, the electronic device 101 may determine a use state of the memory 130 based on the priority of the process terminated in operation 520. For example, the PMM 340 may receive the priority or priority parameter of the terminated process from the LMKD 310. The electronic device 101 may determine the use state of the memory 130 to be a classified use state, such as Light, Normal, Heavy, or Critical, based on the priority of the terminated process. The electronic device 101 may determine the use state of the memory 130 according to a set range of the priority of the process. For example, the electronic device 101 may determine the use state of the memory 130 to be Critical when the priority of the terminated process is less than or equal to "800", to be Heavy when the priority of the terminated process is greater than "800" or less than or equal to "850", to be Normal when the priority of the terminated process is greater than "850" and less than or equal to "900", and to be Light when the priority of the terminated process is greater than "900".

As an example, the electronic device 101 may identify the temperature of the electronic device 101 including the memory 130, in operation 530. The description of operation 420 of FIG. 4 may apply to operation 530 substantially in the same manner.

As an example, the electronic device 101 may determine whether the use state of the memory 130 is a set use state, in operation 540. In embodiments, the set use state may be, for example, a predetermined use state. The set use state may be a state in which there is a serious lack of the memory 130 and thus, needs to be preferentially secured. When the use state of the memory 130 is the set use state, the electronic device 101 may maintain the initially set value of the memory parameter 330, rather than determining the memory parameter 330.

As another example, different from the embodiment shown in FIG. 5, when the use state of the memory 130 is the set use state, for example, when the memory 130 needs to be preferentially secured, the electronic device 101 may determine the memory parameter 330 to be a maximum value that can be set, in operation 540.

As an example, the electronic device 101 may compare the temperature of the electronic device 101 with a set temperature, in operation 550. In embodiments, the set temperature may be, for example, a predetermined temperature. For example, when the temperature of the electronic device 101 is greater than or equal to the set temperature, the electronic device 101 may determine a memory parameter (e.g., the memory parameter 330 of FIG. 3) in view of the temperature and the use state of the memory 130. For example, when the temperature of the electronic device 101 corresponds to None, Light, or Moderate, the electronic device 101 may maintain the initially set memory parameter 330 as the memory parameter 330. When the temperature of the electronic device 101 is greater than or equal to the set temperature, for example, greater than or equal to Severe in operation 550, the electronic device 101 may determine the memory parameter 330 according to operation 560.

As an example, the electronic device 101 may determine the memory parameter 330 based on a table that is set with respect to a variation in the memory parameter 330 according to the use state and the temperature, in operation 560. The electronic device 101 may use the table that sets a size of the memory parameter 330 to which the initially set memory parameter 330 is to be changed according to the use state of the memory 130 and the temperature. The electronic device 101 may determine the memory parameter 330 in view of a variation in the memory parameter 330 from the initially set memory parameter 330. An example of a table set according to the use state of the memory 130 and the temperature is described below with reference to FIG. 7.

As an example, the electronic device 101 may convert a used area of the memory 130 into an available area based on the memory parameter 330, in operation 570. The description of operation 440 of FIG. 4 may apply to operation 570 substantially in the same manner.

Figure 6:
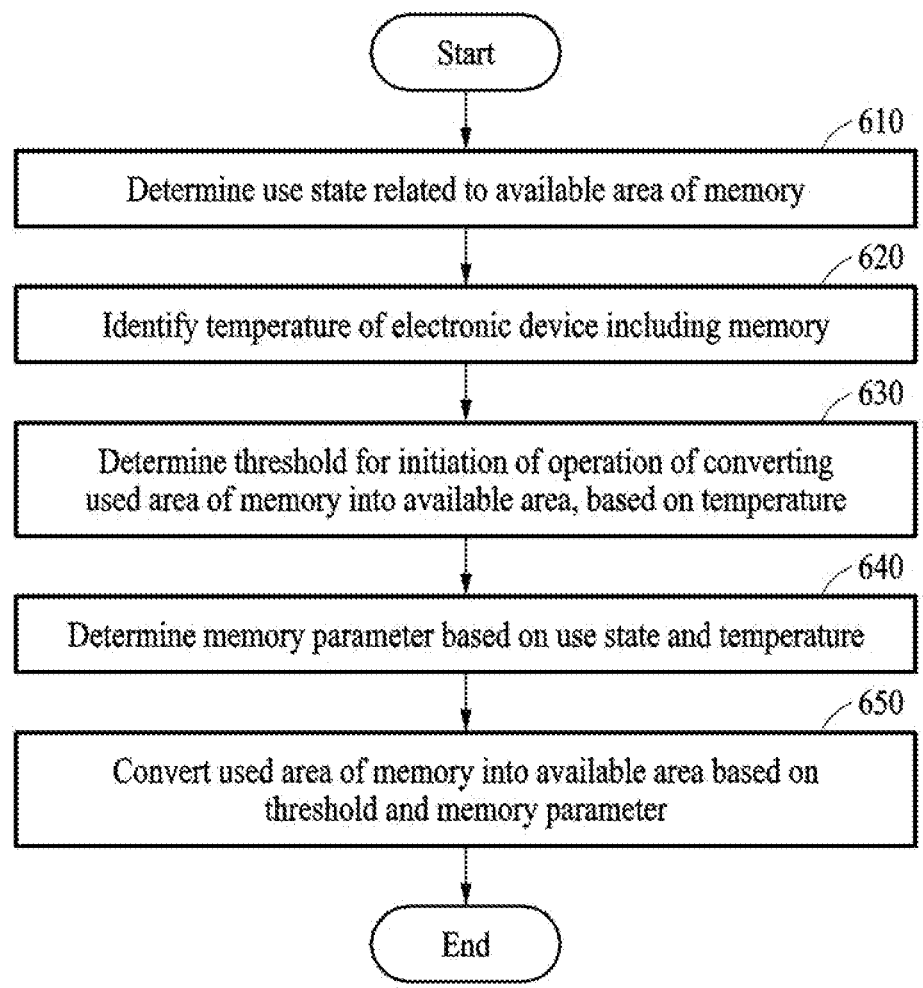
FIG. 6 is a flowchart illustrating a memory control method using a threshold determined according to a temperature according to an embodiment.

FIG. 6 is a flowchart illustrating a memory (e.g., the memory 130 of FIG. 1) control method using a threshold determined according to a temperature according to an embodiment.

Referring to FIG. 6, an electronic device (e.g., the electronic device 101 of FIG. 1) may determine a use state related to an available area of the memory 130, in operation 610. As an example, the electronic device 101 may identify the temperature of the electronic device 101 including the memory 130, in operation 620. The description of operations 410 and 420 of FIG. 4 may apply to operations 610 and 620 substantially in the same manner.

As an example, the electronic device 101 may determine a threshold based on the temperature, in operation 630. The threshold determined in operation 630 may be a parameter for the operation of converting a used area of the memory 130 into an available area. For example, when the size of the available area of the memory 130 is less than the threshold, a Kswapd (e.g., the Kswapd 320 of FIG. 3) may convert the used area of the memory 130 into an available area.

As an example, the electronic device 101 may determine the threshold to be higher as the temperature increases, in operation 630. When the temperature of the electronic device 101 is high, the Kswapd 320 may operate, and the temperature of the electronic device 101 may increase according to the operation of the processor 120. When the temperature is high, the electronic device 101 may set the threshold to be high, thereby delaying an operation initiation time of the Kswapd 320 and controlling the heat generation of the electronic device 101.

As an example, the electronic device 101 may determine a memory parameter (e.g., the memory parameter 330 of FIG. 3) based on the use state and the temperature, in operation 640. The description of operation 430 of FIG. 4 may apply to operation 640 substantially in the same manner.

As an example, the electronic device 101 may convert a used area of the memory 130 into an available area based on the threshold and the memory parameter 330, in operation 650. When the size of the available area of the memory 130 is less than the threshold, the electronic device 101 may initiate operation 650 of converting the used area of the memory 130 into an available area. The electronic device 101 may convert the used area of the memory 130 into an available area according to the memory parameter 330. For example, the size of the converted available area of the memory 130 may be determined according to the memory parameter 330.

As an example, the electronic device 101 may convert the used area of the memory 130 into an available area according to operation 650 until the size of the available area of the memory 130 is greater than or equal to the threshold. As another example, the electronic device 101 may operate as many times as the Kswapd 320 operates, as determined according to the memory parameter 330, to convert the used area of the memory 130 into an available area.

Referring to the embodiment shown in FIG. 6, the electronic device 101 may determine a parameter for the operation initiation time of the Kswapd 320 for converting the used area of the memory 130 into an available area according to the temperature, thereby controlling the heat generation of the electronic device 101.

FIG. 7 is a diagram illustrating a variation in a memory parameter (e.g., the memory parameter 330 of FIG. 3) according to a use state of a memory (e.g., the memory 130 of FIG. 1) and a temperature according to an embodiment.

Referring to FIG. 7, an electronic device (e.g., the electronic device 101 of FIG. 1) may determine the memory parameter 330 based on a table that is set with respect to a variation in the memory parameter 330 according to a use state of the memory 130 and a temperature. In the table of FIG. 7, the variation in the memory parameter 330 may be an amount of change to be applied to the initially set memory parameter 330.

For example, the electronic device 101 may maintain the value of the initially set memory parameter 330 when the use state (e.g., a user state of FIG. 7) of the memory 130 is Heavy and a heat generation state is Severe. When the heat generation state changes to Critical, Emergency, or Shutdown, the electronic device 101 may decrease the value of the memory parameter 330 by "15" or "30" from the value of the initially set memory parameter 330.

As in the above example, the electronic device 101 may dynamically determine the memory parameter 330 in view of the temperature.

For example, when the heat generation state is Severe and the use state of the memory 130 is Heavy, the electronic device 101 may maintain the value of the initially set memory parameter 330. When the use state of the memory 130 changes to Normal or Light, the electronic device 101 may decrease the value of the memory parameter 330 by "15" or "30" from the value of the initially set memory parameter 330.

As in the above example, the electronic device 101 may dynamically determine parameters of the memory 130 in view of the use state of the memory 130.

Referring to FIG. 7, when the use state of the memory 130 is a set use state, the electronic device 101 may maintain a set parameter as the memory parameter 330. When an available area of the memory 130 is not appropriately secured, the electronic device 101 may not operate normally. When there is a lack of the available area of the memory 130 such that the operation of the electronic device 101 may fail, the electronic device 101 may determine the memory parameter 330 irrespective of the temperature of the electronic device 101 to secure the available area of the memory 130 with priority.

For example, when the use state of the memory 130 is Critical in the example of FIG. 7, the electronic device 101 may maintain the initially set value as the memory parameter 330 without considering the heat generation state.

The embodiment shown in FIG. 7 illustrates a case in which the set use state is Critical, and a use state different from the embodiment shown in FIG. 7 may be set. For example, the set use state may be set to Critical or Heavy. In the case in which the set use state is Critical or Heavy, the electronic device 101 may not change the memory parameter 330 when the use state of the memory 130 is Critical or Heavy.

The example set in FIG. 7 is one of various embodiments, and the memory parameter 330 may be determined differently from the embodiment shown in FIG. 7. For example, when the use state of the memory 130 is Critical, the electronic device 101 may determine the memory parameter 330 to be a maximum value, irrespective of the temperature of the electronic device 101.

As an example, the range of the maximum value and the minimum value of the memory parameter 330 may be set. For example, when the memory parameter 330 relates to a swappiness, the memory parameter 330 may be determined within a range of a minimum value of "60" and a maximum value of "160". The maximum value and the minimum value of the memory parameter 330 may be one of the various embodiments, and the memory parameter 330 may be determined in a range different from the above example.

According to the table shown in FIG. 7, the electronic device 101 may determine the memory parameter 330 in view of both the use state of the memory 130 and the temperature, thereby maintaining the performance of the electronic device 101 and controlling the heat generation of the electronic device 101.

According to an embodiment, an electronic device (e.g., the electronic device 101 of FIG. 1) may include a processor (e.g. the processor 120 of FIG. 1), which may be for example at least one processor, and a memory (e.g., the memory 130 of FIG. 1) electrically connected to the processor 120 and configured to store instructions executable by the processor 120, wherein the processor 120 may be configured to, when the instructions are executed, determine a use state of the electronic device corresponding to an available area of the memory 130, determine a temperature of the electronic device 101, set a memory parameter 330 related to a size for converting a used area of the memory 130 into an available area based on the use state and the temperature, and convert a used area of the memory 130 into an available area based on the memory parameter 330.

The processor 120 may be configured to terminate a process using an area of the memory 130 according to a priority of the process based on the available area of the memory 130 and a predetermined threshold, and determine the use state based on the priority of the terminated process.

The processor 120 may be configured to compress data stored in the used area of the memory 130 and store the compressed data in a predetermined area of the memory 130, based on the memory parameter 330, and convert the used area of the memory 130 into the available area by deleting the data stored in the used area of the memory 130.

A size of the memory parameter 330 may have a positive correlation with a size of the converted available area.

A size of the memory parameter 330 may have a negative correlation with, or be negatively correlated with, a size of the available area of the memory 130 according to the use state, and have a negative correlation with, or be negatively correlated with, the temperature.

The processor 120 may be configured to determine the memory parameter 330 based on a table indicating a variation to be applied to the memory parameter 330 according to the use state and the temperature.

The processor 120 may be configured to maintain a predetermined memory parameter 330 as the memory parameter 330 when the use state is a predetermined use state.

The processor 120 may be configured to determine a threshold for converting a used area of the memory 130 into an available area based on the temperature, and convert a used area of the memory 130 into an available area based on an amount of the available area of the memory 130 and the threshold.

According to an embodiment, an electronic device (e.g., the electronic device 101 of FIG. 1) may include a processor (e.g. the processor 120 of FIG. 1) and a memory (e.g., the memory 130 of FIG. 1) electrically connected to the processor 120 and configured to store instructions executable by the processor 120, wherein the processor 120 may be configured to, when the instructions are executed, determine a use state of the electronic device corresponding to an available area of the memory 130, determine a temperature of the electronic device 101, determine a threshold for converting a used area of the memory 130 into an available area based on the temperature, set a memory parameter (e.g., the memory parameter 330 of FIG. 3) related to return of a used area of the memory 130 based on the use state and the temperature, and based on a size of the available area of the memory being less than the threshold, convert a used area of the memory 130 into an available area according to the memory parameter 330.

The processor 120 may be configured to determine the threshold to have a positive correlation with, or to be positively correlated with, the temperature.

The processor 120 may be configured to compress data stored in the used area of the memory 130 and store the compressed data in a predetermined area of the memory 130, based on the memory parameter 330, and convert the used area of the memory 130 into the available area by deleting the data stored in the used area of the memory 130.

The size of the memory parameter 330 may have a negative correlation with, or be negatively correlated with, the available area of the memory 130 according to the use state, and have a negative correlation with, or be negatively correlated with, the temperature.

According to an embodiment, a method of controlling a memory may include determining a use state corresponding to an available area of a memory (e.g., the memory 130 of FIG. 1), determining a temperature of an electronic device 101 including the memory 130, setting a memory parameter (e.g., the memory parameter 330 of FIG. 3) related to a size for converting a used area of the memory 130 into an available area based on the use state and the temperature, and converting a used area of the memory 130 into an available area based on the memory parameter 330.

The determining of the use state may include terminating a process that uses an area of the memory 130 according to a priority of the process based on the available area of the memory 130 and a predetermined threshold, and determining the use state based on the priority of the terminated process.

The converting into the available area of the memory 130 may include compressing data stored in the used area of the memory 130 and storing the compressed data in a predetermined area of the memory 130, based on the memory parameter 330, and converting the used area of the memory 130 into the available area by deleting the data stored in the used area of the memory 130.

A size of the memory parameter 330 may have a positive correlation with, or be positively correlated with, a size of the converted available area of the memory 130.

The size of the memory parameter 330 may have a negative correlation with, or be negatively correlated with, the available area of the memory 130 according to the use state, and have a negative correlation with, or be negatively correlated with, the temperature.

The determining of the memory parameter 330 may include determining the memory parameter 330 based on a table indicating a variation to be applied to the memory parameter 330 according to the use state and the temperature.

The determining of the memory parameter 330 may include maintaining a predetermined memory parameter 330 as the memory parameter 330 based on the use state being a predetermined use state.

The method of controlling the memory 130 may further include determining a threshold for converting a used area of the memory 130 into an available area of the memory 130 based on the temperature, wherein the converting of the used area of the memory 130 into the available area of the memory 130 may include converting a used area of the memory 130 into an available area of the memory 130 based on an amount of the available area of the memory 130 and the threshold.

The electronic device according to the embodiments disclosed herein may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a memory configured to store instructions; and
at least one processor configured to execute the instructions to:
   determine a use state of the electronic device corresponding to an available area of the memory,
   identify a temperature of the electronic device,
   determine a memory parameter based on the use state and the temperature, and
   convert a used area of the memory into the available area based on the memory parameter.

2. The electronic device of claim 1, wherein the at least one processor is further configured to execute the instructions to:
   terminate, based on the available area of the memory and a predetermined threshold, a process using an area of the memory according to a priority of the process, and
   determine the use state based on the priority of the terminated process.

3. The electronic device of claim 1, wherein the at least one processor is further configured to execute the instructions to:
   compress, based on the memory parameter, data stored in the used area of the memory and store the compressed data in a predetermined area of the memory, and
   convert the used area of the memory into the available area by deleting the data stored in the used area of the memory.

4. The electronic device of claim 1, wherein a size of the memory parameter is positively correlated with a size of the converted available area.

5. The electronic device of claim 1, wherein a size of the memory parameter is negatively correlated with a size of the available area of the memory, wherein the use state indicates the size of the available area of the memory, and
   wherein the size of the memory parameter is negatively correlated with the temperature.

6. The electronic device of claim 5, wherein the at least one processor is further configured to execute the instructions to determine the memory parameter based on a table indicating a variation to be applied, according to the use state and the temperature, to the memory parameter.

7. The electronic device of claim 1, wherein the at least one processor is further configured to execute the instructions to maintain, based on the use state being a predetermined used state, a predetermined memory parameter as the memory parameter.

8. The electronic device of claim 1, wherein the at least one processor is further configured to execute the instructions to:
   determine, based on the temperature, a threshold for converting the used area of the memory into the available area, and
   convert the used area of the memory into the available area based on an amount of the available area of the memory and the threshold.

9. An electronic device comprising:
a memory electrically configured to store instructions; and
at least one processor configured to execute the instructions to:
   determine a use state of the electronic device corresponding to an available area of the memory,
   determine a temperature of the electronic device,
   determine, based on the temperature, a threshold for converting a used area of the memory into the available area,
   determine a memory parameter based on the use state and the temperature, and
   based on a size of the available area of the memory being less than the threshold, convert the used area of the memory into the available area according to the memory parameter.

10. The electronic device of claim 9, wherein the at least one processor is further configured to execute the instructions to determine the threshold to be positively correlated with the temperature.

11. The electronic device of claim 9, wherein the at least one processor is further configured to execute the instructions to:
   compress, based on the memory parameter, data stored in the used area of the memory and store the compressed data in a predetermined area of the memory, and
   convert the used area of the memory into the available area by deleting the data stored in the used area of the memory.

12. The electronic device of claim 9, wherein a size of the memory parameter is negatively correlated with the available area of the memory, wherein the available area of the memory is according to the use state, and
   wherein the size of the memory parameter is negatively correlated with the temperature.

13. A method of controlling a memory, the method comprising:
   determining a use state corresponding to an available area of the memory;
   determining a temperature of an electronic device comprising the memory;
   determining a memory parameter based on the use state and the temperature; and
   converting a used area of the memory into the available area based on the memory parameter.

14. The method of claim 13, wherein the determining of the use state comprises:
   terminating, based on the available area of the memory and a predetermined threshold, a process using an area of the memory according to a priority of the process; and
   determining the use state based on the priority of the terminated process.

15. The method of claim 13, wherein the converting into the available area of the memory comprises:
   compressing, based on the memory parameter, data stored in the used area of the memory and storing the compressed data in a predetermined area of the memory; and
   converting the used area of the memory into the available area by deleting the data stored in the used area of the memory.

16. The method of claim 13, wherein a size of the memory parameter is positively correlated with a size of the converted available area of the memory.

17. The method of claim 13, wherein a size of the memory parameter is negatively correlated with the available area of the memory, wherein the use state indicates the size of the available area of the memory, and
   wherein the size of the memory parameter is negatively correlated with the temperature.

18. The method of claim 17, wherein the determining of the memory parameter comprises determining the memory parameter based on a table indicating a variation to be applied, according to the use state and the temperature, to the memory parameter.

19. The method of claim 13, wherein the determining of the memory parameter comprises maintaining, based on the use state being a predetermined use state, a predetermined memory parameter as the memory parameter.

20. A non-transitory computer-readable storage medium storing instructions that, when executed by a processor, cause the processor to:
   determine a use state corresponding to an available area of the memory;
   determine a temperature of an electronic device comprising the memory;
   determine a memory parameter based on the use state and the temperature; and
   convert a used area of the memory into the available area based on the memory parameter.

* * * * *